(12) United States Patent
Layfield et al.

(10) Patent No.: US 8,839,905 B2
(45) Date of Patent: Sep. 23, 2014

(54) TYRE CAVITY NOISE ABSORBER

(75) Inventors: Jonathan Layfield, Cheshire (GB); Andrew McKinlay, Cheshire (GB)

(73) Assignee: Bentley Motors Limited (GB)

( * ) Notice: Subject to any disclaimer, the term of this patent is extended or adjusted under 35 U.S.C. 154(b) by 0 days.

(21) Appl. No.: 13/818,867

(22) PCT Filed: Aug. 31, 2011

(86) PCT No.: PCT/GB2011/051631
§ 371 (c)(1),
(2), (4) Date: Jun. 6, 2013

(87) PCT Pub. No.: WO2012/028877
PCT Pub. Date: Mar. 8, 2012

(65) Prior Publication Data
US 2013/0240290 A1 Sep. 19, 2013

(30) Foreign Application Priority Data
Sep. 1, 2010 (GB) .................. 1014503.5

(51) Int. Cl.
*B60C 5/02* (2006.01)
*F16F 15/14* (2006.01)
*B60C 19/00* (2006.01)
*B60C 5/00* (2006.01)
*F16F 15/10* (2006.01)

(52) U.S. Cl.
CPC .................. *B60C 19/002* (2013.04)
USPC ........................... 181/207; 152/155

(58) Field of Classification Search
USPC ............ 181/207; 152/400, 381.5, 504, 341.1, 152/454, 155, 331.1
See application file for complete search history.

(56) References Cited

U.S. PATENT DOCUMENTS

| | | | | |
|---|---|---|---|---|
| 3,949,796 A * | 4/1976 | Bartos | ........................... | 152/158 |
| 4,392,522 A * | 7/1983 | Bschorr | ..................... | 152/341.1 |
| 4,399,851 A * | 8/1983 | Bschorr | ........................ | 152/156 |
| 4,909,295 A * | 3/1990 | Nirei et al. | .................. | 152/333.1 |
| 5,479,974 A * | 1/1996 | Noggle et al. | .............. | 152/333.1 |
| 6,343,843 B1 * | 2/2002 | Nishikawa | .................... | 301/6.91 |
| 6,450,225 B2 * | 9/2002 | Yukawa et al. | ............ | 152/381.6 |
| 6,533,009 B2 * | 3/2003 | Aoki | ........................... | 152/381.6 |
| 6,588,469 B2 * | 7/2003 | Yukawa et al. | ............... | 152/157 |
| 6,880,597 B2 * | 4/2005 | Yukawa et al. | ............ | 152/381.6 |
| 7,475,713 B2 | 1/2009 | Naito et al. | | |
| 7,500,499 B2 * | 3/2009 | Tanno | ........................... | 152/155 |
| 7,556,075 B2 * | 7/2009 | Tanno | ........................... | 152/155 |
| 7,581,577 B2 * | 9/2009 | Tanno | ........................... | 152/450 |
| 7,677,286 B2 * | 3/2010 | Tanno | ........................... | 152/516 |

(Continued)

FOREIGN PATENT DOCUMENTS

| | | |
|---|---|---|
| DE | 40 01 753 | 7/1991 |
| DE | 102 20 193 | 11/2003 |

(Continued)

*Primary Examiner* — Edgardo San Martin
(74) *Attorney, Agent, or Firm* — Salter & Michaelson

(57) ABSTRACT

A tire cavity noise absorber has a body of sound absorbing material and a support. The absorber is arranged such that, when installed in a tire cavity and the tire is stationary, the support supports the body of sound absorbing material in a position spaced from the inside circumferential wall of the tire. The support may be flexible and allow the body of sound absorbing material to expand towards and contact the inside of the tire when the tire rotates.

25 Claims, 4 Drawing Sheets

(56) References Cited

U.S. PATENT DOCUMENTS

| | | | |
|---|---|---|---|
| 7,717,146 B2 * | 5/2010 | Yukawa et al. | 152/450 |
| 7,740,035 B2 * | 6/2010 | Fowler-Hawkins | 152/381.5 |
| 7,854,244 B2 * | 12/2010 | Tanno | 152/155 |
| 7,874,329 B2 * | 1/2011 | Tanno | 152/155 |
| 8,028,796 B2 * | 10/2011 | Ishihara | 181/211 |
| 8,136,560 B2 * | 3/2012 | Tanno | 152/155 |
| 8,151,930 B2 * | 4/2012 | Yukawa | 181/207 |
| 8,196,628 B2 * | 6/2012 | Fowler-Hawkins | 152/381.6 |
| 8,342,289 B2 * | 1/2013 | Tanno | 181/207 |
| 8,365,782 B2 * | 2/2013 | Tanno et al. | 152/157 |
| 8,448,743 B2 * | 5/2013 | Tanno et al. | 181/207 |
| 8,505,677 B2 * | 8/2013 | Tanno et al. | 181/207 |
| 2005/0211358 A1 * | 9/2005 | Tanno | 152/450 |
| 2005/0217777 A1 * | 10/2005 | Yukawa et al. | 152/450 |
| 2006/0108042 A1 * | 5/2006 | Yukawa et al. | 152/450 |
| 2007/0199636 A1 * | 8/2007 | Tanno | 152/520 |
| 2008/0099116 A1 | 5/2008 | Tanno | |
| 2008/0264539 A1 | 10/2008 | Merino-Lopez et al. | |
| 2009/0090446 A1 * | 4/2009 | Ikeda et al. | 152/450 |
| 2009/0277549 A1 * | 11/2009 | Tanno | 152/157 |
| 2009/0314402 A1 * | 12/2009 | Kuramori et al. | 152/155 |
| 2010/0307655 A1 | 12/2010 | Tanno | |
| 2011/0061781 A1 * | 3/2011 | Tanno | 152/450 |
| 2011/0083778 A1 * | 4/2011 | Fowler-Hawkins | 152/331.1 |
| 2012/0247636 A1 * | 10/2012 | Fowler-Hawkins | 152/339.1 |
| 2012/0325383 A1 * | 12/2012 | Moore et al. | 152/155 |
| 2013/0098521 A1 * | 4/2013 | Fowler-Hawkins | 152/331.1 |

FOREIGN PATENT DOCUMENTS

| | | | |
|---|---|---|---|
| DE | 10 2009 024 454 | 12/2010 | |
| EP | 1980421 A1 * | 10/2008 | B60C 17/06 |
| EP | 2 123 491 | 11/2009 | |
| JP | 05294102 A * | 11/1993 | B60C 5/00 |
| JP | 2001180218 | 7/2001 | |
| JP | 2006 044 503 | 2/2006 | |
| WO | 2007/002479 | 1/2007 | |

* cited by examiner

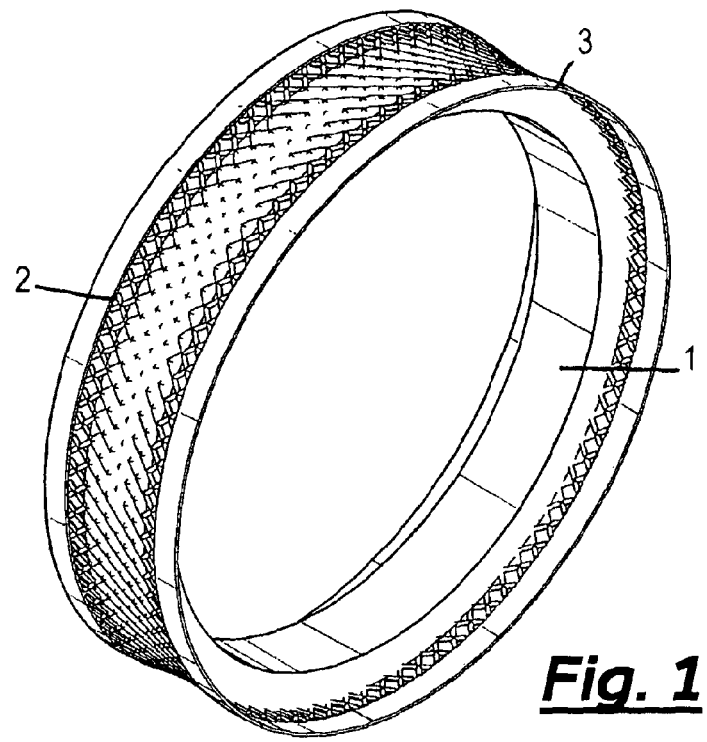
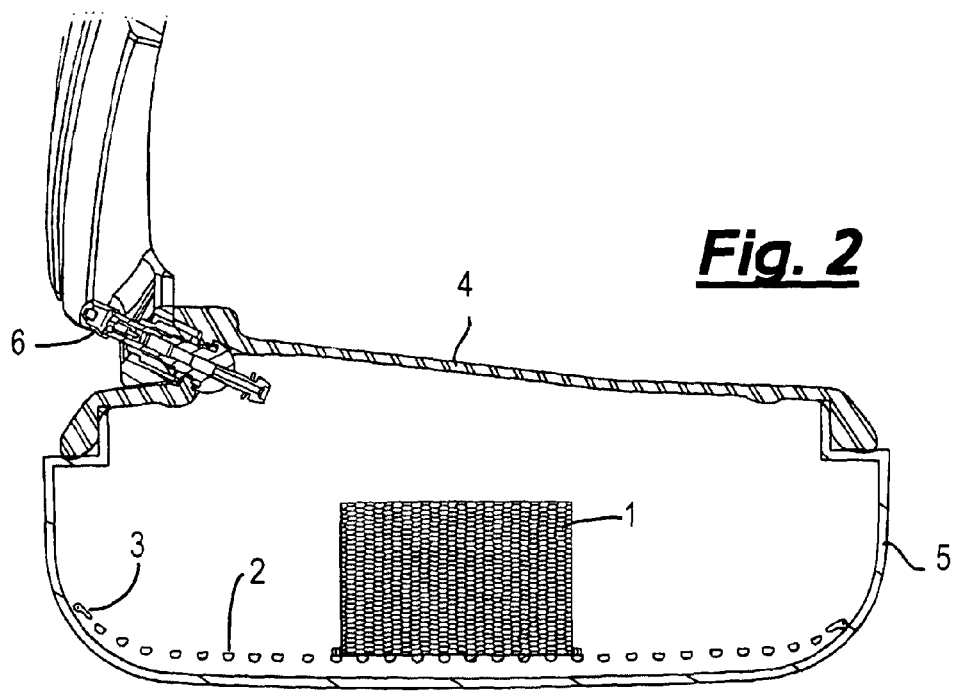

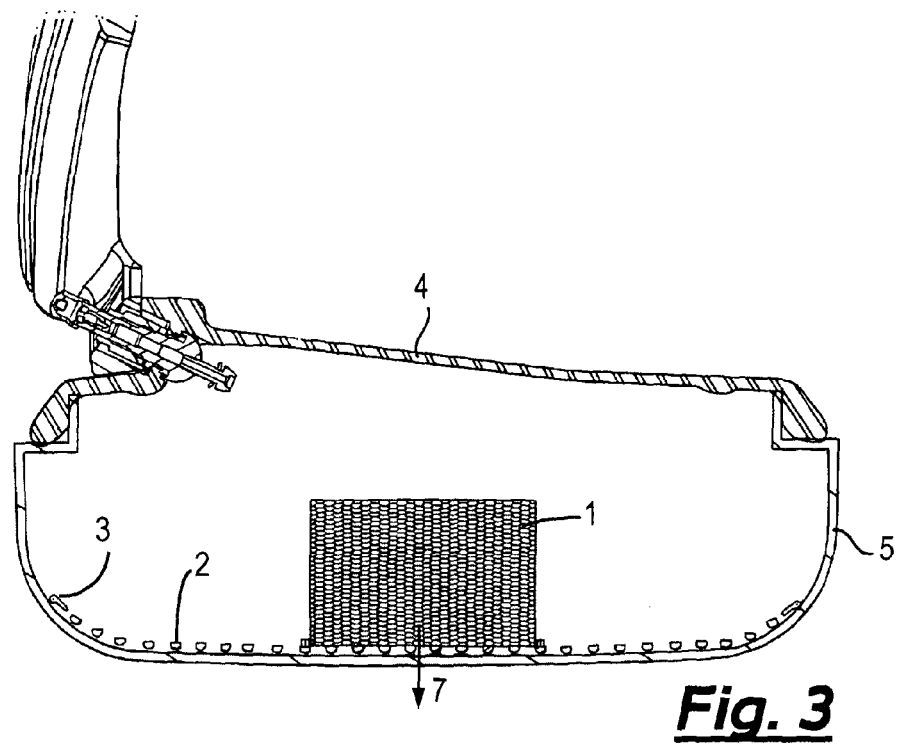
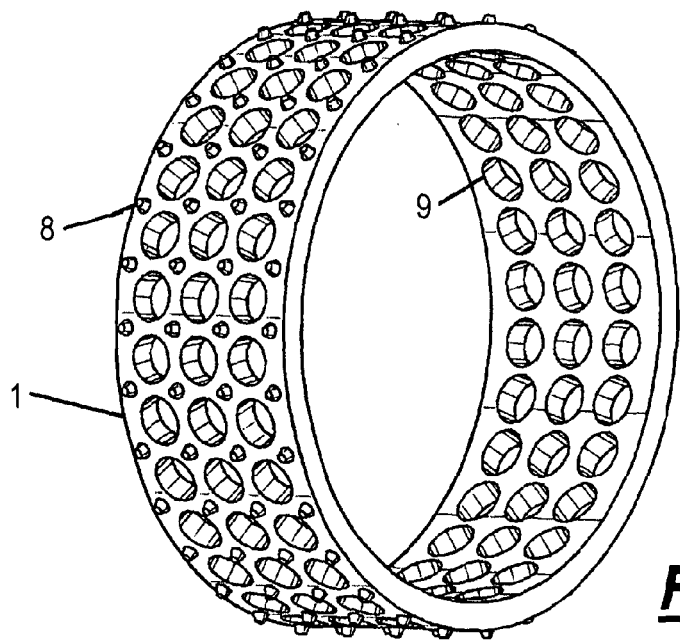

TYRE CAVITY NOISE ABSORBER

TECHNICAL FIELD OF THE INVENTION

The present invention relates to a tyre cavity noise absorber, and to a wheel and tyre assembly comprising a tyre cavity noise absorber.

BACKGROUND TO THE INVENTION

A pneumatic wheel and tyre assembly, when inflated, is an acoustically resonant toroidal structure with, in the case of automobile wheels, a cavity frequency typically around 200 Hz. Resonant vibration results from exciting a standing wave in the air-filled torus by driving the automobile over a coarse road surface, for example of concrete or asphalt containing large stones. The resultant cavity noise may be transmitted to the interior of the vehicle by either airborne or structure-borne transfer paths. The amplitude of the noise may be sufficient to cause discomfort to the vehicle's passengers, and may cause a reduction in the perceived quality of the vehicle.

Tyre cavity noise may be controlled by modifying the forcing function, transfer functions or response functions in the vehicle. The most effective intervention typically is in the forcing function i.e. in the tyre cavity itself. To this end it is known to introduce a cavity noise absorber into a pneumatic tyre which attenuates the cavity resonance either by dividing the cavity space to prevent the formation of a standing wave, or by absorbing the energy of a standing wave in an acoustic damping material.

Conventional tyre noise absorbers suffer a number of disadvantages. Some are mounted to the inside of the circumferential wall of a tyre. In this position they interfere with the deployment of liquid puncture repair systems, which are now increasingly provided in place a spare wheel for automobiles to reduce both cost and vehicle mass. Others are mounted to the outside of the wheel, and in this position they can interfere with the process of fitting a tyre to the wheel. There are also problems with absorber durability and stability at high rotational speeds.

It is an object of embodiments of the present invention to address some or all of these problems.

SUMMARY OF THE INVENTION

According to a first aspect of the present invention there is provided a tyre cavity noise absorber comprising a body of sound absorbing material and a support arranged such that, when the noise absorber is installed in a tyre cavity and the tyre is stationary, the support contacts an inside wall of the tyre to support the body of sound absorbing material in a position spaced from the inside circumferential wall of the tyre.

Supporting the body of sound absorbing material in a position spaced from the inside circumferential wall of the tyre facilitates deployment of a liquid puncture repair.

The support may be a single structure or it may comprise a plurality of structures. The support may be arranged to contact the inner side walls and/or the inner circumferential wall of a tyre. Where the support is arranged to contact the inner circumferential wall of a tyre it is preferably arranged to contact only a small fraction of the surface area of the circumferential wall of the tyre, for example less than 5% and preferably less than 1%, so as not to interfere with the operation of a liquid puncture repair. The support may be arranged to lie between the inner circumferential wall of the tyre and the body of sound absorbing material. The support preferably does not absorb liquids. The support may be formed from a substantially solid plastics material.

The support may be formed either separately from or integrally with the body of sound absorbing material. The support may be resilient. In one arrangement the support enables the body of sound absorbing material to move towards the inside circumferential wall of the tyre under the action of centrifugal force as the tyre rotates, but returns the body of sound absorbing material to a position spaced from the tyre wall as rotation of the tyre slows or stops.

In one embodiment the support comprises a resiliently deformable mesh. The mesh may be formed from a plastics material. The mesh may form a ring. Free edges of the mesh on opposite sides of the ring may joined to a ring formed from a strip of material, such as plastic material, which may also be resiliently deformable. The outside circumferential surface of the ring may be concave so that the edges of the ring will contact the inner circumferential wall of a tyre in which the ring is placed.

In another embodiment the support comprises a plurality of legs, which may be resilient. The legs may be elongate. The legs may be formed from a plastics material and may form part of a mesh or a splayed arrangement of legs. In another embodiment the support structure comprises a plurality of feet disposed on the outside surface of the body of sound absorbing material. In yet another embodiment the support structure comprises a ridge or ridges disposed on the outside surface of the body of sound absorbing material. Two ridges may be provided, disposed respectively at opposite circumferential edges of the body of sound absorbing material.

The body of sound absorbing material may be made from a foamed plastics material. Any other suitable acoustic damping material could be used. The body of sound absorbing material may be flexible and, in particular, may be resiliently flexible. The body of sound absorbing material may be generally annular in cross-section and may be generally toroidal in shape. The body of sound absorbing material may be arranged to expand to bear against the inside circumferential wall of a tyre in which it is fitted under the action of centrifugal force, deforming or absorbing the support, when the tyre is rotated above a predetermined rate. Apertures may extend through the body of sound absorbing material to allow a liquid puncture repair to flow through the body. Apertures may extend through the toroidal body. The body of sound absorbing material may be provided with a cover. The cover may be formed from a fabric.

The noise absorber is preferably arranged so that when fitted into the tyre of a wheel and tyre assembly it is spaced from the wheel.

DETAILED DESCRIPTION OF THE INVENTION

In order that the invention may be more clearly understood embodiments thereof will now be described, by way of example only, with reference to the accompanying drawings, of which:

FIG. 1 is a perspective view of a first embodiment of a tyre cavity noise absorber according to the invention;

FIG. 2 is a cross-sectional view of part of a wheel and tyre assembly with the noise absorber of FIG. 1 fitted when the wheel is stationary;

FIG. 3 is a corresponding view to FIG. 2 when the wheel is in motion;

FIG. 4 is a perspective view of a second embodiment of a tyre cavity noise absorber according to the invention;

DETAILED DESCRIPTION

Figure 5:
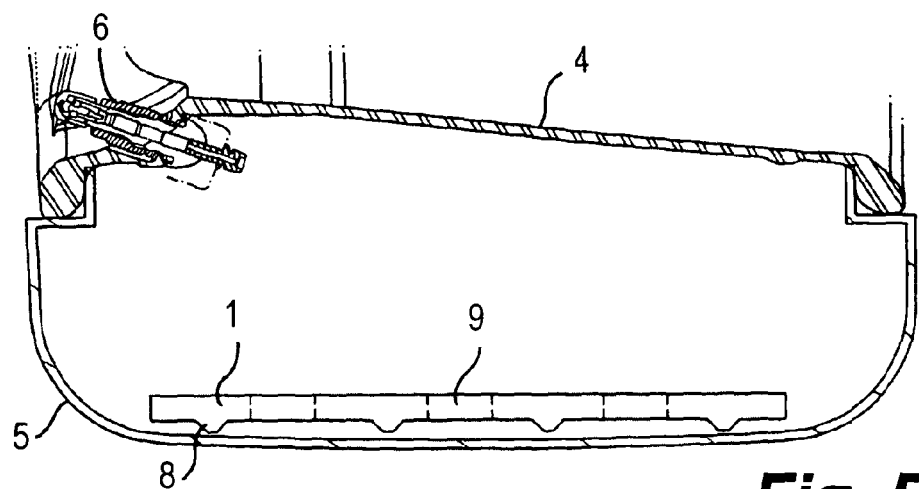
FIG. 5 is a cross-sectional view of part of a wheel and tyre assembly with the noise absorber of FIG. 4 fitted.

Referring to FIGS. 1 to 3 a tyre noise absorber comprises a generally toroidal body of sound absorbing material 1. The body of material is formed from a resiliently flexible open celled foamed polypropylene material disposed in a stretchable fabric cover to contain any pieces of the foamed material which may break off. Other suitable materials could be used. The body has a substantially annular axial cross-section, and a substantially rectangular radial cross-section The body is surrounded by and joined to the inside circumferential surface of a generally cylindrical resilient mesh 2 moulded from a plastics material. The mesh 2 could be embedded or partially embedded in the body. Alternatively (or additionally) the body is bonded to the mesh with an adhesive.

Free ends of the mesh 2 project axially beyond the edges of the body 1 and are joined to respective rings 3 of resilient plastics material, one on each axial side of the body. The outside circumferential surface of the mesh 2 is concave.

FIGS. 2 and 3 show a cross-section through part of a wheel and tyre assembly showing a rim 4 of a wheel supporting a pneumatic tyre 5. In use, the tyre noise absorber is disposed in the tyre 5 of the wheel and tyre assembly. The outside diameter of the rings 3 at each side of the noise absorber is chosen to be the same or slightly greater than the inside diameter of the tyre. The noise absorber is deformed to enable it to be inserted into the tyre whereupon, due to the resiliency of the materials it is formed from, it seeks to resume its original shape, causing the rings 3 to bear against the inner wall of the tyre in the regions where the inside surface of the side walls of the tyre meet the inner circumferential surface of the tyre. Owing to its shape, the mesh 2 thus supports the body of sound absorbing material 1 a position spaced from the inner circumferential surface of the tyre.

With the noise absorber in this position the tyre can then be fitted to a wheel as the free ends of the side walls of the tyre may be pinched together to urge the tyre onto the wheel without interfering with the body of sound absorbing material 1.

As the body of sound absorbing material is spaced from the inner circumferential wall of the tyre 5 it permits a liquid puncture repair to be employed as liquid introduced into the tyre through an inflation valve 6 fitted to the wheel can flow around the inside circumferential surface of the tyre without being blocked or absorbed by the body of sound absorbing material 1. The rings 3 and mesh 2 are made from solid plastics material, will not absorb a puncture repair fluid and only make minimal contact with the surface of the tyre.

When the wheel is in use on a vehicle and the vehicle is driven the tyre cavity noise absorber will rotate with the wheel. As the rotational speed of the wheel increases the body of sound absorbing material will expand radially outwardly in the direction indicated as 7 in FIG. 3, under the action of centrifugal force, causing the mesh to flatten against the inner circumferential wall of the tyre, sandwiched between the body of sound absorbing material 1 and the tyre. This may cause the free edges of the mesh to be displaced apart from each other, sliding the rings 3 away from each other across the inside surface of the tyre 5. The greater the rotational velocity of the wheel the greater the force urging the noise absorber into contact with the tyre, which more securely locates the body of sound absorbing material relative to the tyre reducing the risk of the body causing out of balance forces. As the vehicles slows to a stop the resilient nature of the body of sound absorbing material 1 and mesh 2 will return the body substantially to its original location within the wheel shown in FIG. 2.

Referring now to FIGS. 4 and 5, in an alternative embodiment a foamed plastics material body of sound absorbing material 1 has an elongate substantially rectangular radial cross-section. A plurality of feet 8 are distributed around the circumferential outer surface of the body of sound absorbing material. The feet are arranged in axially extending rows of four spaced circumferentially evenly around body 1. The feet 8 are of substantially frustro-conical shape and are moulded from the material of the body, the body 1 with feet 8 being moulded in one piece. In an alternative embodiment the feet are made from a different material to the body.

Between each row of feet is a row of three substantially circular apertures 9 which extend through the body 1. Other shapes and disposition of apertures is possible.

The size of the body 1 is chosen so that when fitted to a wheel and tyre assembly the body urges the feet 8 into contact with the inner circumferential surface of the tyre, the feet 8 spacing the body from that surface. As the body is relatively thin in a radial direction it does not interfere with fitting of the tyre to a wheel. The feet 8 space the body 1 from the tyre to enable a liquid puncture repair to be used and, in addition, the apertures 9 enable a tyre repair liquid to flow through the body to ensure good distribution over the interior surface of the tyre.

As the wheel rotates, the body will become more firmly urged into contact with the interior circumferential surface of the tyre, firmly locating the tyre noise absorber and reducing the risk of it causing out of balance forces.

Figure 6:
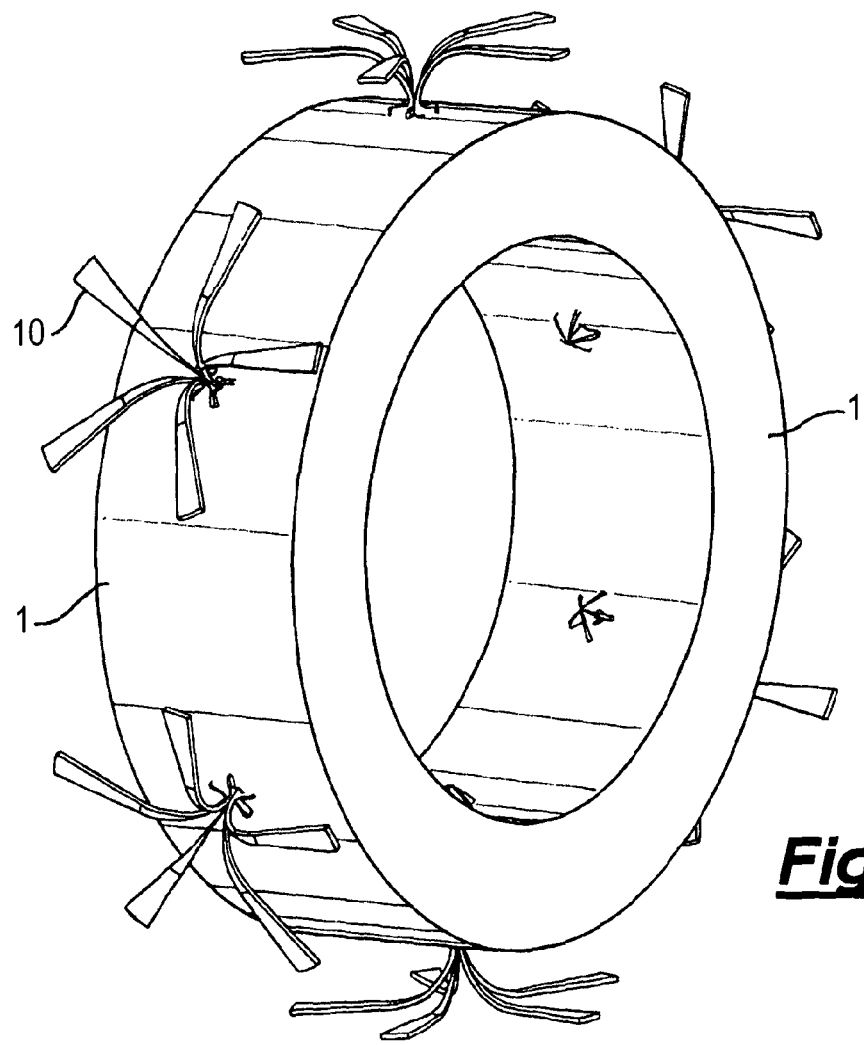
FIG. 6 is a perspective view of a third embodiment of a tyre cavity noise absorber according to the invention.
Figure 7:
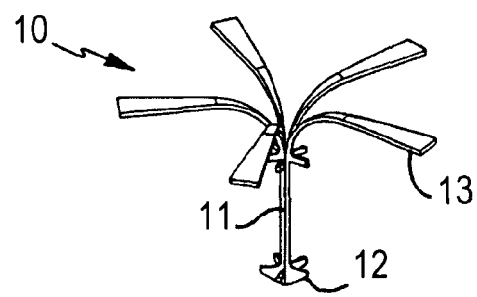
FIG. 7 is a perspective view of a support of the noise absorber of FIG. 6.

Referring now to FIGS. 6 and 7, this embodiment of a tyre noise absorber includes a body of sound absorbing material 1 of generally similar form to that of the embodiment of FIGS. 1 to 3. Rather than being provided with a mesh support 2, though, the body is provided with a plurality of circumferentially spaced supports 10. The supports 9 are moulded from a flexible, resilient plastics material and comprise a shaft 11 with an arrow head 12 at one end and five splayed legs 13 at the other.

The supports 10 are inserted radially though the body 1 so that the arrow head 12 projects from the inner circumferential surface of the body and the legs 13 project from the outer circumferential surface of the body. The arrow head 12 effectively prevents the support from being pulled out of the body, and the splayed legs project radially outwardly from the surface of the body so that in use they contact the inner circumferential wall of a tyre in which the noise absorber is disposed. The supports space the body from the inner tyre wall, but owing their resilient flexible nature the legs 13 will splay further when subjected to centrifugal force allowing the body to contact the tyre and return the body substantially to its original position when the force is removed or reduced. Thus, this embodiment provides similar advantages to that of FIGS. 1 to 3.

Figure 8:
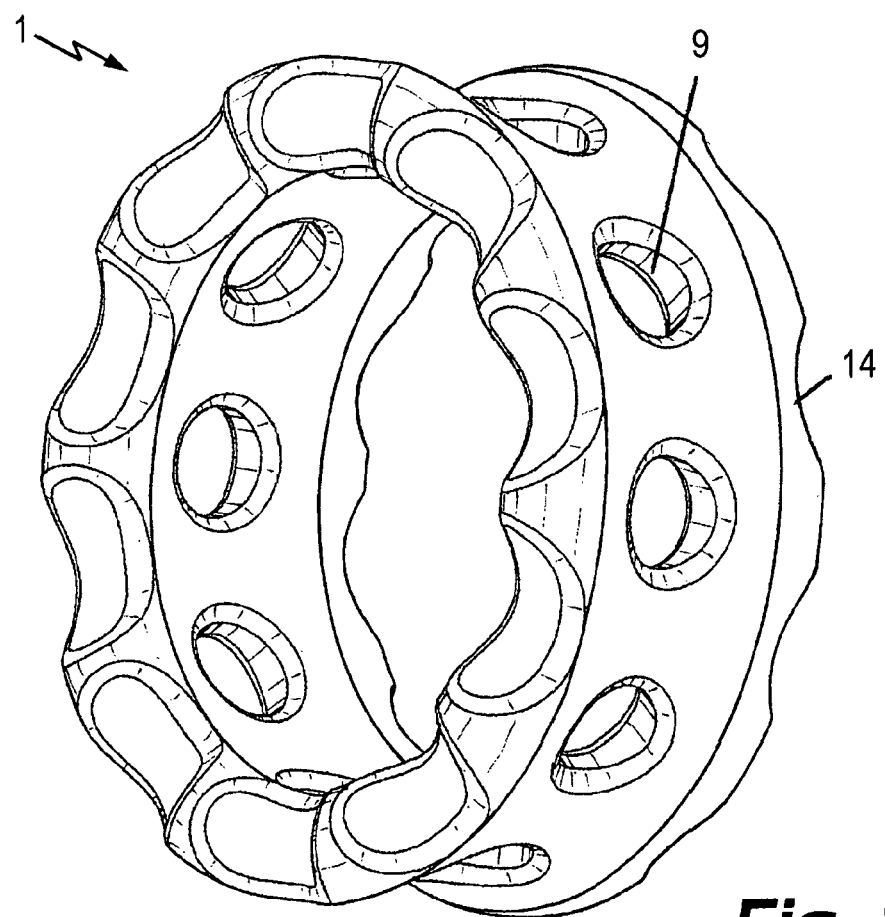
FIG. 8 is a perspective view of a fourth embodiment of a tyre cavity noise absorber according to the invention.

Referring to FIG. 8 this absorber is generally toroidal and moulded in one piece from a flexible, resilient foamed plastics material. The outer circumferential surface of the absorber is concave, so that when disposed in a tyre the absorber only contacts the inner circumferential surface of the tyre with ridges 14 located at opposite axial edges respectively of the absorber. Thus, the absorber will only contact edges of the internal circumferential wall of a tyre, minimising contact with the tyre and allowing use of a liquid puncture repair.

The axial sides of the absorber are scalloped so as to further reduce contact between the absorber and a tyre in which it is fitted.

Apertures 9 are formed radially though the absorber and distributed around its circumference to allow a liquid puncture repair to flow through the absorber.

The absorber could be formed from a resiliently compressible material, such as a foam material so that when the tyre in which it is installed rates the absorber is urged into greater contact with the inside surface of the tyre.

All of the tyre noise absorbers described are dimensioned so that when fitted in a tyre fitted to a wheel the noise absorber is spaced from the wheel.

The various embodiments all enable a liquid tyre repair to be employed whilst remaining spaced from the wheel to facilitate fitting a tyre to a wheel. In use, centrifugal forces will serve to locate or improve location of the absorber to the tyre to reduce the risk of out of undesirable out of balance forces being generated. Encapsulating a foam body of sound absorbing material in fabric, or any other suitable cover such as a film, contains any material that may break off the body preventing it from interfering with the wheel valve or causing any other problem.

The above embodiments are described by way of example only. Many variations are possible without departing from the scope of the invention as defined in the appended claims.

What is claimed is:

1. A tyre cavity noise absorber comprising:
 a body of sound absorbing material and a resilient support formed separately from the body of sound absorbing material and arranged such that,
 when the noise absorber is installed in a tyre cavity and the tyre is stationary, the support contacts an inside wall of the tyre to support the body of sound absorbing material in a position spaced from the inside circumferential wall of the tyre;
 when the tyre rotates, the support enables the body of sound absorbing material to move towards the inside circumferential wall of the tyre under the action of centrifugal force; and
 when rotation of the tyre slows or stops, the support returns the body of sound absorbing material to a position spaced from the inside circumferential wall of the tyre.

2. A tyre cavity noise absorber as claimed in claim 1 wherein the support is arranged to contact the inner circumferential wall of the tyre.

3. A tyre cavity noise absorber as claimed in claim 1 wherein the support is arranged to contact less than 5% of the surface area of the circumferential wall of the tyre.

4. A tyre cavity noise absorber as claimed in claim 1 wherein the support does not absorb liquids.

5. A tyre cavity noise absorber as claimed in claim 1 wherein the support is formed from a substantially solid plastics material.

6. A tyre cavity noise absorber as claimed in claim 1 wherein the support comprises a mesh.

7. A tyre cavity noise absorber as claimed in claim 6 wherein the mesh is ring shaped and the body of sound absorbing material in supported on the inner circumferential surface of the mesh.

8. A tyre cavity noise absorber as claimed in claim 7 wherein the outside circumferential surface of the mesh is concave.

9. A tyre cavity noise absorber as claimed in claim 1 wherein the support comprises a plurality of deformable legs.

10. A tyre cavity noise absorber as claimed in claim 1 wherein the support structure comprises a plurality of feet disposed on an outside surface of the body of sound absorbing material.

11. A tyre cavity noise absorber as claimed in claim 1 wherein the support structure comprises a ridge or ridges disposed on an outside surface of the body of sound absorbing material.

12. A tyre cavity noise absorber as claimed in claim 1 wherein the body of sound absorbing material is made from a foamed plastics material.

13. A tyre cavity noise absorber as claimed in claim 1 wherein the body of sound absorbing material is flexible.

14. A tyre cavity noise absorber as claimed in claim 1 wherein the body of sound absorbing material is resilient.

15. A tyre cavity noise absorber as claimed in claim 1 wherein the body of sound absorbing material is arranged to expand to bear against the inside circumferential wall of a tyre in which it is fitted when the tyre is rotated above a predetermined rate.

16. A tyre cavity noise absorber as claimed in claim 1 wherein the body of sound absorbing material is provided with a cover.

17. A wheel and tyre assembly comprising a tyre cavity noise absorber as claimed in claim 1.

18. A wheel and tyre assembly as claimed in claim 17 wherein the body of sound absorbing material of the tyre noise absorber is spaced from the wheel.

19. A tyre cavity noise absorber comprising a body of sound absorbing material and a support arranged such that, when the noise absorber is installed in a tyre cavity and the tyre is stationary, the support contacts an inside wall of the tyre to support the body of sound absorbing material in a position spaced from the inside circumferential wall of the tyre, wherein the support comprises a mesh.

20. A tyre cavity noise absorber as claimed in claim 19 wherein the mesh is ring shaped and the body of sound absorbing material in supported on an inner circumferential surface of the mesh.

21. A tyre cavity noise absorber as claimed in claim 19 wherein an outside circumferential surface of the mesh is concave.

22. A tyre cavity noise absorber comprising a body of sound absorbing material and a support arranged such that, when the noise absorber is installed in a tyre cavity and the tyre is stationary, the support contacts an inside wall of the tyre to support the body of sound absorbing material in a position spaced from the inside circumferential wall of the tyre, wherein the body of sound absorbing material is arranged to expand to bear against the inside circumferential wall of a tyre in which it is fitted when the tyre is rotated above a predetermined rate.

23. A tyre cavity noise absorber for support within a tyre having an inside circumferential wall, said noise absorber comprising:
 a body of sound absorbing material; and
 a resilient support for supporting the body of sound absorbing material and that is constructed and arranged to be disposed separately from the body of sound absorbing material;
 said noise absorber having a stationary position when the tyre is stationary and an expanded position when the tyre is rotating;
 wherein, when the noise absorber is installed in a tyre cavity and the tyre is stationary, the noise absorber is in the stationary position in which the resilient support contacts the inside circumferential wall of the tyre while disposing the body of sound absorbing material spaced from the inside circumferential wall of the tyre;

wherein, when the tyre rotates, the noise absorber assumes the expanded position in which the resilient support causes the body of sound absorbing material to move towards the inside circumferential wall of the tyre under the action of centrifugal force; and wherein, when rotation of the tyre slows or stops, the resilient support returns the body of sound absorbing material to a position spaced from the inside circumferential wall of the tyre.

24. A tyre cavity noise absorber as claimed in claim 23 wherein the resilient support is wider than the body of sound absorbing material so that when the noise absorber is deformed to enable it to be inserted into the tyre, due to the resiliency of the materials it is formed from, it seeks to resume its original shape, causing the resilient support to bear against the inner circumferential wall of the tyre.

25. A tyre cavity noise absorber as claimed in claim 24 wherein in the expanded position the centrifugal force causes the resilient support to flatten against the inside circumferential wall so that the body of sound absorbing material moves toward the inside circumferential wall of the tyre.

* * * * *